Patented Dec. 24, 1946

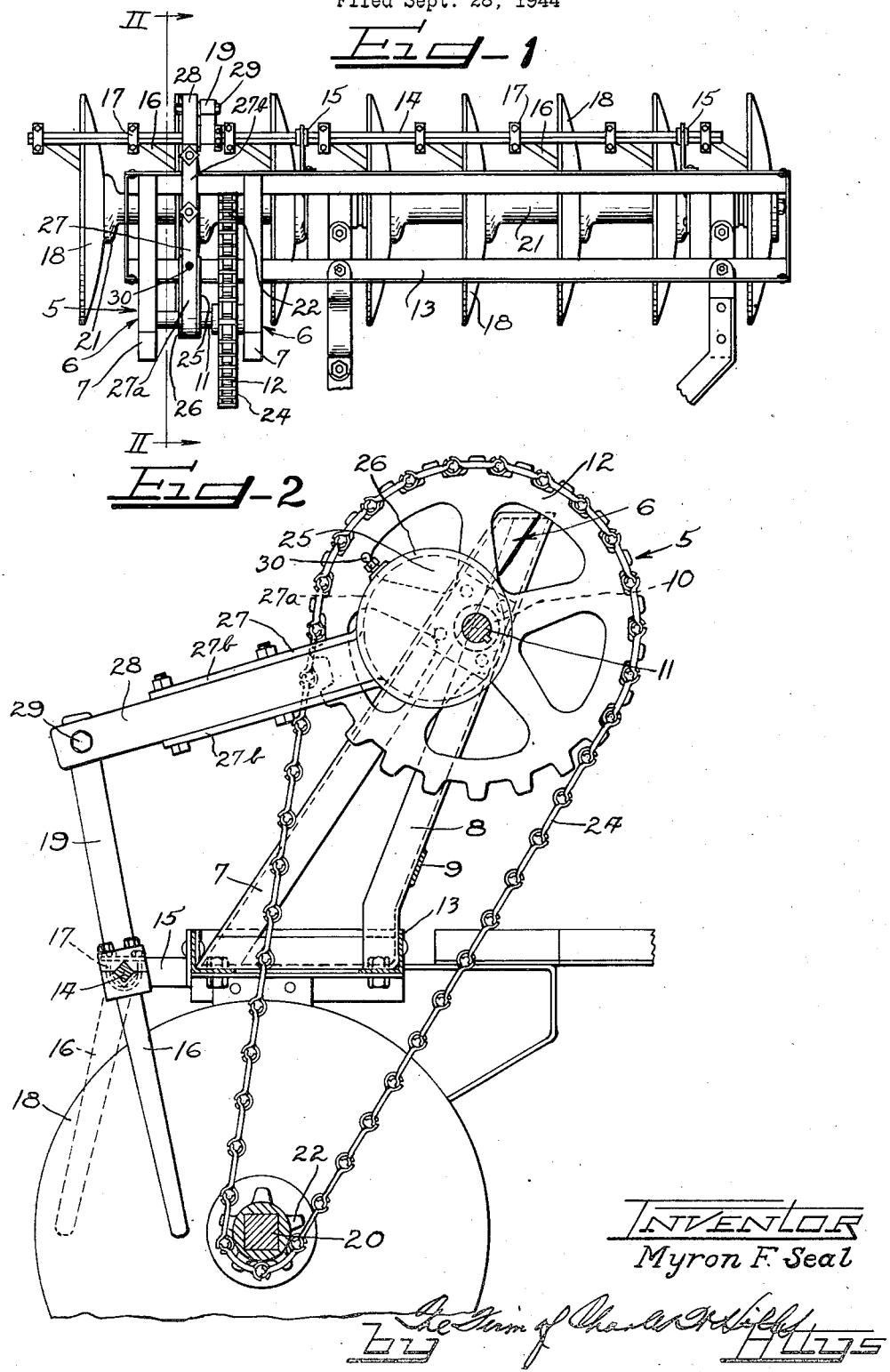

2,413,246

UNITED STATES PATENT OFFICE 2,413,246

AUTOMATIC SCRAPER FOR DISK HARROWS

Myron F. Seal, Weldon, Ill.

Application September 28, 1944, Serial No. 556,123

1 Claim. (Cl. 97—224)

This invention relates to an automatic scraper for disk harrows.

More specifically, the invention relates to a device for incorporation in a disk harrow to scrape the blades periodically and automatically.

Disk harrows, which are used for breaking up and smoothing the surface of cultivated fields preparatory to planting, are usually drawn in tandem by a tractor or other source of motive power, the first harrow initially breaking up lumps and clods and the rear harrow reducing the fragments to still smaller size and smoothing the ground. Earth tends to cling to the disk blades, and in order to smooth the ground properly it is desirable that this earth be removed frequently or even continuously, especially from the rear harrow blades. For this purpose manually operated scrapers have been provided for disk harrows. Such scrapers require frequent and regular operation by the operator of the harrow, with consequent diversion of his attention from his driving. Even skilled, experienced operators encounter difficulty, and unskilled or inexperienced operators cannot harrow a field properly, especially when the ground is moist and tends to cling to and cake upon the disks.

By this invention, means are provided by which scraping of the disk blades is automatically performed continuously and regularly at any desired intervals. The operator is relieved of the task of continually operating the scraper, and can devote his entire attention to the driving, so that even an inexperienced operator can harrow a field satisfactorily. The device may be attached to a harrow without interfering with its operation in any way, and may include as a part thereof a manual scraping device already forming a part of the harrow, or the harrow may be originally manufactured with the automatic scraper of this invention as a part thereof.

It is an object of this invention to provide an automatic scraper for disk harrows.

It is another object of this invention to provide an automatic scraping device for disk harrow blades which scrapes the blades at regular intervals during operation of the harrow without requiring attention by the operator.

It is a further object of this invention to provide an automatic scraper for disk harrows which is actuated by the harrow itself.

It is an additional object of this invention to provide an automatic scraper for disk harrows in which eccentric means are provided to cause reciprocation of the scrapers over the disk blades.

It is still another object of this invention to provide an automatic scraper for disk harrows in which the scrapers are reciprocated over the disk blades in timed relation to the movement of the blades.

It is also an object of this invention to provide an automatic scraper for disk harrows in which movement of the scrapers in timed relation to the movement of the disk blades may be varied.

Other and further objects of the invention will be apparent to those skilled in the art from the following description and the appended drawing.

In the drawing:

Figure 1 is a plan view of the device of this invention mounted on one set of disk blades of a disk harrow, and Figure 2 is a sectional view of the apparatus taken substantially along the line II—II of Figure 1.

As shown in the drawing:

The automatic scraper apparatus is designated generally as 5 and comprises a mounting or supporting structure of two spaced support elements 6 each formed of two angle members 7 and 8 having the ends thereof suitably connected. One or more braces 9 may extend between the support elements 6. Journalled in suitable bearings 10 on the supports 6 is a shaft 11, and keyed or otherwise secured on the shaft 11 is a sprocket wheel 12.

The support structure is secured to the frame 13 of a disk harrow in any suitable manner, as by bolts. A rocking shaft or bar 14 is supported from the frame 13 by brackets 15, or other suitable means, in which said bar is mounted for oscillatory movement about its axis. Scraper blades 16 are fixedly secured on the rocking bar 14 in any suitable manner as by bolt clamps 17. Each scraper blade 16 extends close to but just out of contact with the concave surface of a disk blade 18 of the harrow. A lever 19 is secured in any suitable manner to the rocking bar 14 and extends in the direction opposite to that of the scraper blade 16, so that the rod 14 acts as a pivot for the lever and scraper blades.

The disk blades 18 are mounted on a square arbor bolt or axle 20, with spacer sleeves 21 disposed on the axle between adjacent disk blades 18. One of said spacer sleeves is provided with sprocket teeth 22 in the plane of the sprocket wheel 12. The sprocket 22 may be provided in various ways. For example, one of the spacer sleeves 21 may be formed with sprocket teeth thereon, as described, or a sprocket wheel in the form of a split collar may be secured on the spacer sleeve 21, or the sprocket wheel may be mounted directly on the axle 20 and spacing elements provided on either side thereof to space the adjacent disk blades 18 properly. A sprocket chain 24 is trained over the sprocket wheels 12 and 22. Rotation of the axle 20 as the harrow is drawn along thus causes rotation of the sprocket wheel 12 and of the shaft 11 to which it is secured.

Eccentrically secured on the shaft 11 is a cylindrical member or drum 25 provided with spaced peripheral flanges 26. A metal strap 27 formed with a circular loop 27a and with its ends 27b substantially parallel completes the eccentric construction. The loop 27a extends about the eccentric drum 25 between the flanges 26, and the ends 27b are secured to an arm 28. Said arm 28 has a pivotal connection 29 with the free end of the lever 19. The pivotal connection may be provided by a bolt, as shown. Means for lubricating the contacting surfaces of the collar or loop 27a and the drum 25 may be provided, such as the nipple 30 or other suitable means, and similar means (not shown) may be provided on the bearings 10.

The sprocket wheel 12 is preferably made considerably larger than the sprocket 22, so that the shaft 11 will rotate more slowly than the axle 20, although this might, of course, be reversed if desired. The ratio between the sizes of the sprocket wheels determines the frequency of the scraping cycles of the scraper blades 16 relative to the rotation of the disk blades 18. As shown, the ratio between the wheel 12 and the wheel 22 is approximately 4 to 1, and accordingly the scraper blades 16 would complete one scraping cycle for about every four revolutions of the disk blades 18.

The operation of the automatic scraper will be clear from the description given above. As the harrow is moved, the sprocket 22 rotates with the axle 20 to drive the sprocket wheel 12 through the sprocket chain 24, thus rotating the shaft 11. Rotation of the shaft 11 causes rotation of the eccentric drum 25, whereby the strap 27 imparts a reciprocating motion to the arm 28, which in turn moves the lever 19 back and forth to rock the bar 14 and oscillate the scraper blades 16 adjacent the surfaces of the disk blades 18. As already pointed out, the speed or frequency of movement of the scraper blades 16 with relation to the rotation of the disk blades 18 may be adjusted as desired by adjusting the ratio between the sprocket wheels 12 and 22. The apparatus is fully automatic, requiring no attention from the operator, and provides more regular scraping than can ordinarily be achieved manually. By utilizing the rotation of the axle 20 to drive the apparatus, no additional source of power is required than that afforded by the tractor or other driving means.

It will be clear that other eccentric means than the eccentric means shown and described might be employed, as for example a crank. Similarly, an endless belt, cable, or the like might be used with pulleys, drums, or the other wheel-like elements, instead of the sprocket construction shown and described. The sprocket construction, however, provides a positive means for preventing slippage and is therefore preferred as being most satisfactory under ordinary conditions.

While my automatic scraper has been illustrated and described in connection with only one gang of blade disks, it is obvious that similar scrapers can be attached to other gangs of blade disks or to all the gangs composing the disk harrow.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

Means for converting a disk harrow having a manually operable rocker bar for operating the disk cleaning blades to one having automatic means for operating the rocker bar, said means including a support adapted to be secured to the frame of a disk harrow, a shaft journalled in said support, a sprocket wheel keyed to said shaft, an eccentric on said shaft, an eccentric strap about said eccentric, an arm connected to said eccentric strap, a lever pivoted at one end of said arm, the other end of said arm being adapted to be connected to the rocker bar of the harrow to rock it as said shaft is rotated, a second sprocket wheel secured to a spacer on the disk shaft, and a sprocket chain trained over said sprocket wheels to rotate said shaft as said harrow is moved.

MYRON F. SEAL.